United States Patent
Yang et al.

(10) Patent No.: US 10,035,540 B2
(45) Date of Patent: Jul. 31, 2018

(54) ANTI-JACKKNIFE STEERING SYSTEM FOR ARTICULATED BUS

(71) Applicant: Aleees Eco Ark (Cayman) Co. Ltd., Grand Cayman (KY)

(72) Inventors: Anthony Antao Yang, Bade (TW); Gordon Ching Chen, Bade (TW)

(73) Assignee: ALEEES ECO ARK (CAYMAN) CO. LTD., Grand Cayman (KY)

( * ) Notice: Subject to any disclaimer, the term of this patent is extended or adjusted under 35 U.S.C. 154(b) by 0 days.

(21) Appl. No.: 15/029,872

(22) PCT Filed: Oct. 16, 2013

(86) PCT No.: PCT/CN2013/085343
§ 371 (c)(1),
(2) Date: Apr. 15, 2016

(87) PCT Pub. No.: WO2015/054856
PCT Pub. Date: Apr. 23, 2015

(65) Prior Publication Data
US 2016/0229453 A1    Aug. 11, 2016

(51) Int. Cl.
*B62D 15/02* (2006.01)
*B62D 13/00* (2006.01)
(Continued)

(52) U.S. Cl.
CPC .......... *B62D 15/025* (2013.01); *B60D 1/322* (2013.01); *B60D 1/62* (2013.01); *B60D 5/00* (2013.01);
(Continued)

(58) Field of Classification Search
CPC . B60D 1/62; B60D 1/322; B60D 5/00; B62D 12/00; B62D 13/00; B62D 13/06; B62D 15/025; B62D 47/025
(Continued)

(56) References Cited

U.S. PATENT DOCUMENTS 3,250,547 A    5/1966  Myers
4,534,436 A *  8/1985  DuFrene ................ B62D 5/083
                                                137/625.21
(Continued)

FOREIGN PATENT DOCUMENTS

CN    1071382 A    4/1993
CN    1583488      2/2005
(Continued)

*Primary Examiner* — Kevin Hurley
*Assistant Examiner* — Felicia L. Brittman
(74) *Attorney, Agent, or Firm* — Kirton McConkie; Evan R. Witt

(57) ABSTRACT

An anti-jackknife steering system for an articulated bus is provided. A hydraulic turntable is used for actively generating a calculated force to balance the inertia of a front frame and a trailer frame. Consequently, the joint angle is adjusted to an optimal range, and the possibility of causing an oversteering event or a jackknife event is largely reduced. Moreover, a wheel brake device cooperates with the hydraulic turntable to assist in the steering action of the articulated bus on a snowy road. Consequently, while the articulated bus is driven on a slippery road, the possibility of causing collision is minimized.

6 Claims, 3 Drawing Sheets

(51) Int. Cl.
  *B60D 1/32*     (2006.01)
  *B60D 1/62*     (2006.01)
  *B60D 5/00*     (2006.01)
  *B62D 12/00*    (2006.01)
  *B62D 47/02*    (2006.01)
  *B62D 13/06*    (2006.01)

(52) U.S. Cl.
  CPC ............ *B62D 12/00* (2013.01); *B62D 13/00* (2013.01); *B62D 13/06* (2013.01); *B62D 47/025* (2013.01)

(58) Field of Classification Search
  USPC ...................................................... 280/446.1
  See application file for complete search history.

(56) References Cited

U.S. PATENT DOCUMENTS

| | | | |
|---|---|---|---|
| 6,225,894 B1 * | 5/2001 | Kyrtsos | B60Q 1/52 180/282 |
| 7,412,315 B2 | 8/2008 | Wildey et al. | |
| 2006/0055240 A1 * | 3/2006 | Toyota | B60K 6/40 303/152 |
| 2011/0266772 A1 | 11/2011 | Andre | |

FOREIGN PATENT DOCUMENTS

| | | |
|---|---|---|
| CN | 2934013 | 8/2007 |
| CN | 201193049 | 2/2009 |
| CN | 101553392 | 10/2009 |
| CN | 101934819 | 1/2011 |
| CN | 102161348 | 8/2011 |
| CN | 102358345 | 2/2012 |
| CN | 102530075 | 7/2012 |
| EP | 0015176 A1 | 9/1980 |
| EP | 0217058 A1 | 4/1987 |
| JP | H07500239 A | 1/1995 |
| JP | 2006081343 A | 3/2006 |
| JP | 2007069907 A | 3/2007 |
| JP | 2008-44428 | 10/2009 |
| WO | 9307023 A1 | 4/1993 |

* cited by examiner

ANTI-JACKKNIFE STEERING SYSTEM FOR ARTICULATED BUS

FIELD OF THE INVENTION

The present invention relates to an anti-jackknife steering system for increasing the driving performance of an articulated bus on a slippery road by using a hydraulic articulated joint and a control method, and more particularly to an anti-jackknife steering system for providing a force to maintain the joint angle in a proper range and maintain the front frame along a desired route. The anti-jackknife steering system is suitably used in a public transport vehicle with an articulated joint.

BACKGROUND OF THE INVENTION

Generally, a four-wheeled vehicle is equipped with a traction control system suitable for a slippery road because driving on the slippery road is unavoidable. An articulated bus is one of the most important transportations in cities. However, the articulated bus lacks a highly sensitive and reactive articulated joint to cooperate with the traction control system. Consequently, in case that the road is influenced by rain and snow and has safety concern, many bus companies are unwilling to provide the articulated bus services.

The driving performance of the commercially available articulated bus on the snowy road is very poor. However, in the snow season, the public transportation becomes more important. Therefore, it is important to provide an advanced articulated joint that cooperates with the traction control system and avoids a jackknife condition or an oversteering condition on a slippery road because of snow or rain.

SUMMARY OF THE INVENTION

Conventionally, an articulated joint of an articulated bus uses a passive damping device to stabilize a trailer frame along a desired track. However, if the friction of the wheel loses suddenly, this articulated joint cannot make an immediate response to the friction loss or balance the inertial force. Consequently, when the conventional articulated bus is driven on a slippery road, a jackknife condition or even an accident occurs.

An object of the present invention provides an anti jackknife steering system for avoiding the occurrence of a jackknife event. A calculated force is applied from an articulated joint to a trailer frame and a front frame. Moreover, by braking a steering wheel inside a front wheel, the friction on the road is increased. Consequently, the articulated bus can be driven on a slippery road (e.g., in a snowy or icy condition) along a maintained route range.

Another object of the present invention provides an anti-jackknife steering system. According to the angle of a steering wheel, the angle of the articulated joint is controlled to lie within a calculated range. Moreover, the angular momentum of the articulated joint is controlled according to the velocity of the articulated bus. Consequently, the possibility of causing the oversteering event or the jackknife event on the slippery road is minimized.

In accordance with an aspect of the present invention, there is provided an anti-jackknife steering system for an articulated bus. The anti-jackknife steering system includes a joint base, a hydraulic turntable, a hydraulic pump, a wheel brake device, two accelerometers and a control unit. The joint base is installed on a front frame of the articulated bus. The hydraulic turntable is installed on the joint base for adjusting a joint angle between the front frame and a trailer frame of the twisted bus in response to a control torsion force. The hydraulic pump is used for driving a small gear that is coupled with the hydraulic turntable. The wheel brake device is coupled with a set of front wheels of the articulated bus. The two accelerometers are installed on the trailer frame and the front frame of the twisted bus for detecting an acceleration message of the trailer frame and an acceleration message of the front frame, respectively. The control unit judges whether a target joint angle of the hydraulic turntable matches a detected position of a steering wheel and compares the detected acceleration message of the trailer frame with the detected acceleration message of the front frame, thereby judging whether a jackknife event occurs. If the jackknife event occurs, the control unit increases a damping force of the hydraulic turntable and adjusts a joint angle of the hydraulic turntable to the target joint angle so as to stabilize the trailer frame.

In an embodiment, a velocity of the articulated bus is judged according to a velocity of a wheel on a non-steerable fixed axle.

In an embodiment, while the anti-jackknife steering system is enabled, the velocity of the articulated bus is limited according to a velocity-limiting means.

In accordance with another aspect of the present invention, there is provided an anti-jackknife steering system for an articulated bus. The anti-jackknife steering system includes a joint base, a hydraulic turntable, a hydraulic pump, two accelerometers and a control unit. The joint base is installed on a front frame of the articulated bus. The hydraulic turntable is installed on the joint base for adjusting a joint angle between the front frame and a trailer frame of the twisted bus in response to a control torsion force. The hydraulic pump is used for driving a small gear that is coupled with the hydraulic turntable. The two accelerometers are installed on the trailer frame and the front frame of the twisted bus for detecting an acceleration message of the trailer frame and an acceleration message of the front frame, respectively. The control unit judges whether a target joint angle of the hydraulic turntable matches a detected position of a steering wheel and compares the detected acceleration message of the trailer frame with the detected acceleration message of the front frame, thereby judging whether a jackknife event occurs. If the jackknife event occurs, the control unit increases a damping force of the hydraulic turntable and adjusts a joint angle of the hydraulic turntable to the target joint angle so as to stabilize the trailer frame.

In an embodiment, a velocity of the articulated bus is judged according to a velocity of a wheel on a non-steerable fixed axle.

In an embodiment, while the anti-jackknife steering system is enabled, the velocity of the articulated bus is limited according to a velocity-limiting means.

The above contents of the present invention will become more readily apparent to those ordinarily skilled in the art after reviewing the following detailed description and accompanying drawings, in which:

DETAILED DESCRIPTION OF THE PREFERRED EMBODIMENT

In accordance with the concept of the present invention, an anti-jackknife steering system is provided for increasing the driving performance of an articulated bus on a slippery road in winter or rainy season. The articulated bus comprises a front frame and a trailer frame. Moreover, a set of steering front wheels, a set of intermediate wheels and a set of rear wheels are installed on the front frame and the trailer frame. Generally, the driving shaft of the power system is connected with the rear wheels of the articulated bus in order to drive the articulated bus. In addition, an articulated joint is used for reducing the turning radius.

Figure 1:
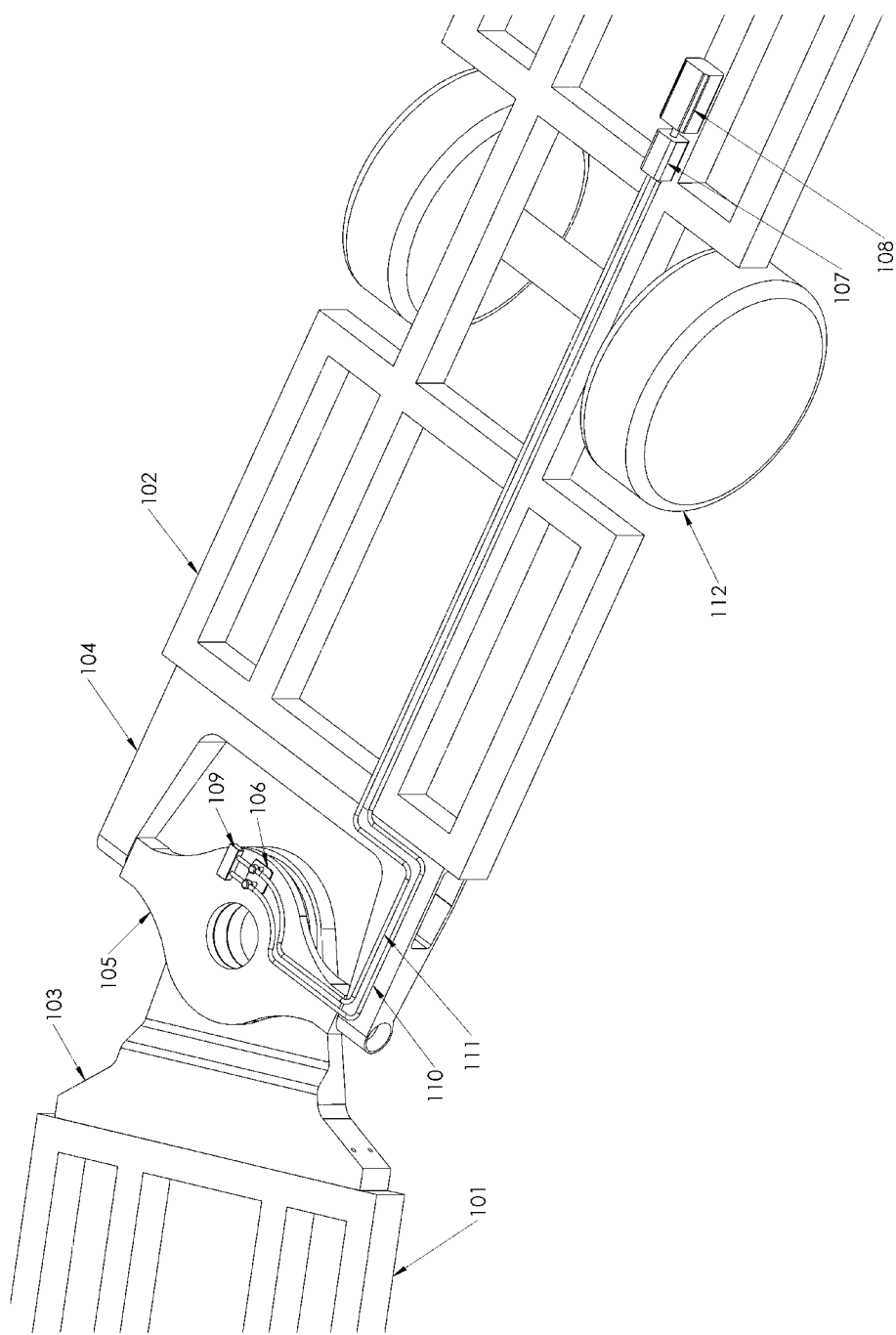
FIG. 1 is a schematic isometric view illustrating an anti-jackknife steering system for an articulated bus according to an embodiment of the present invention.
Figure 2:
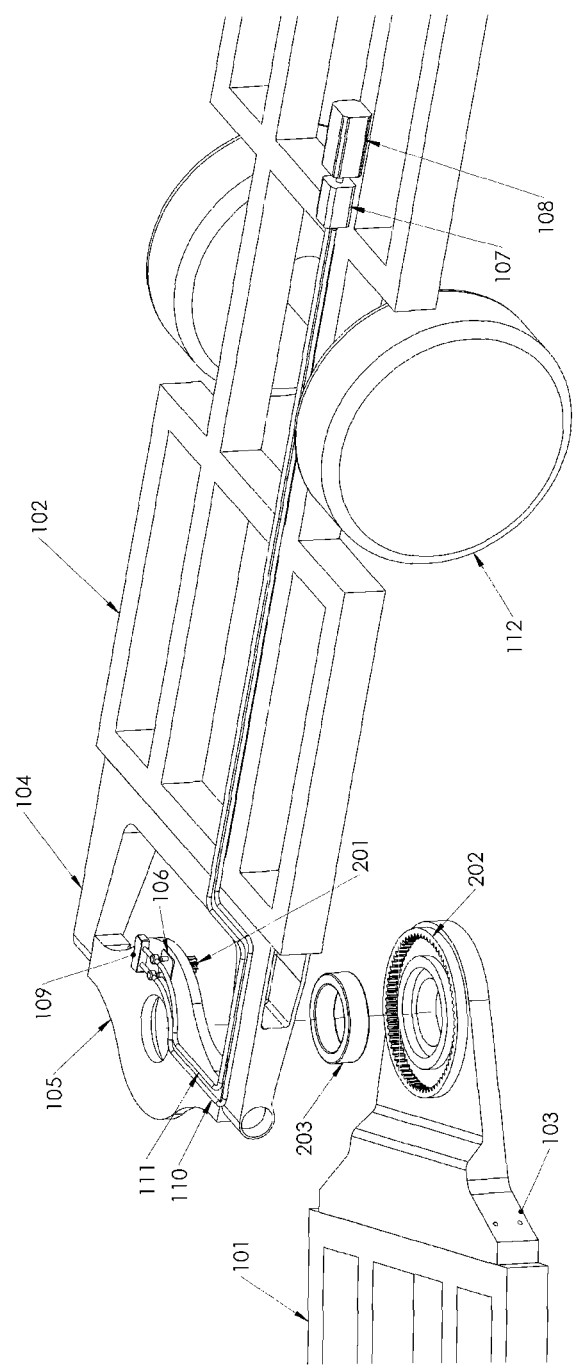
FIG. 2 is a schematic exploded view illustrating the anti-jackknife steering system for the articulated bus according to the embodiment of the present invention.

FIGS. 1 and 2 schematically illustrate the components of an anti-jackknife steering system for an articulated bus according to an embodiment of the present invention. A hydraulic articulated joint comprises a joint base 103, a suspension arm 104 and a hydraulic turntable 105. The joint base 103 is installed on a front frame 101. The suspension arm 104 is installed on a trailer frame 102. The hydraulic turntable 105 is connected with the suspension arm 104 through a shaft. Consequently, the hydraulic turntable 105 is allowed to rotate in a vertical direction. Moreover, the hydraulic turntable 105 comprises a ring gear 202, a small gear 201 and a bearing 203.

The anti-jackknife steering system further comprises two front wheel brake devices for effectively increasing the steering capability of driving on the slippery road.

The anti-jackknife steering system further comprises a control unit and a hydraulic loop. Moreover, a servo motor 108 is installed in an isolated chamber for assuring electric safety. The servo motor 108 is used for driving a main hydraulic pump 107 to pressurize the oil in a first hydraulic tube 110 and a second hydraulic tube 111. The pressurized oil in the first hydraulic tube 110 or the second hydraulic tube 111 drives a hydraulic motor 106 to provide a control torsion force to the small gear 201. The clockwise or counterclockwise direction of the control torsion force is determined according to the direction of the servo motor 108. The control torsion force is transmitted from the small gear 203 to the ring gear 202. Consequently, the hydraulic turntable is rotated and the joint angle of the hydraulic turntable is adjusted according to the command from the control unit.

The hydraulic loop further comprises a pressure regulating valve 109. The pressure regulating valve 109 is a control means of adjusting the maximum hydraulic pressure of the hydraulic loop. The pressure regulating valve 109 is used for controlling the magnitude of a damping force of the hydraulic articulated joint. Consequently, the adjusted oil is allowed to flow through the pressure regulating valve 109 to generate flow resistance in the hydraulic loop. More especially, a controlled drag force is generated to balance the turning action of the hydraulic turntable 105.

During the operation of the anti-jackknife steering system, the control unit reads the position information of the steering wheel and issues a command to the servo moto 108. Moreover, according to a target joint angle corresponding to the position information of the steering wheel, the control unit gradually adjusts the hydraulic turntable to the target joint angle at a controlled velocity.

While the articulated bus is driven on a slippery road, the control unit of the anti-jackknife steering system continuously monitors the joint angle. If the turning direction of the hydraulic articulated joint is opposed to the predetermined direction corresponding to the position of the steering wheel within a predetermined time period, the control unit instructs the servo motor to increase the hydraulic pressure. Consequently, the damping force is increased to stabilize the trailer frame. Then, the control unit instructs an adjusting operation to rotate the hydraulic articulated joint to the target joint angle corresponding to the position of the steering wheel.

Figure 3:
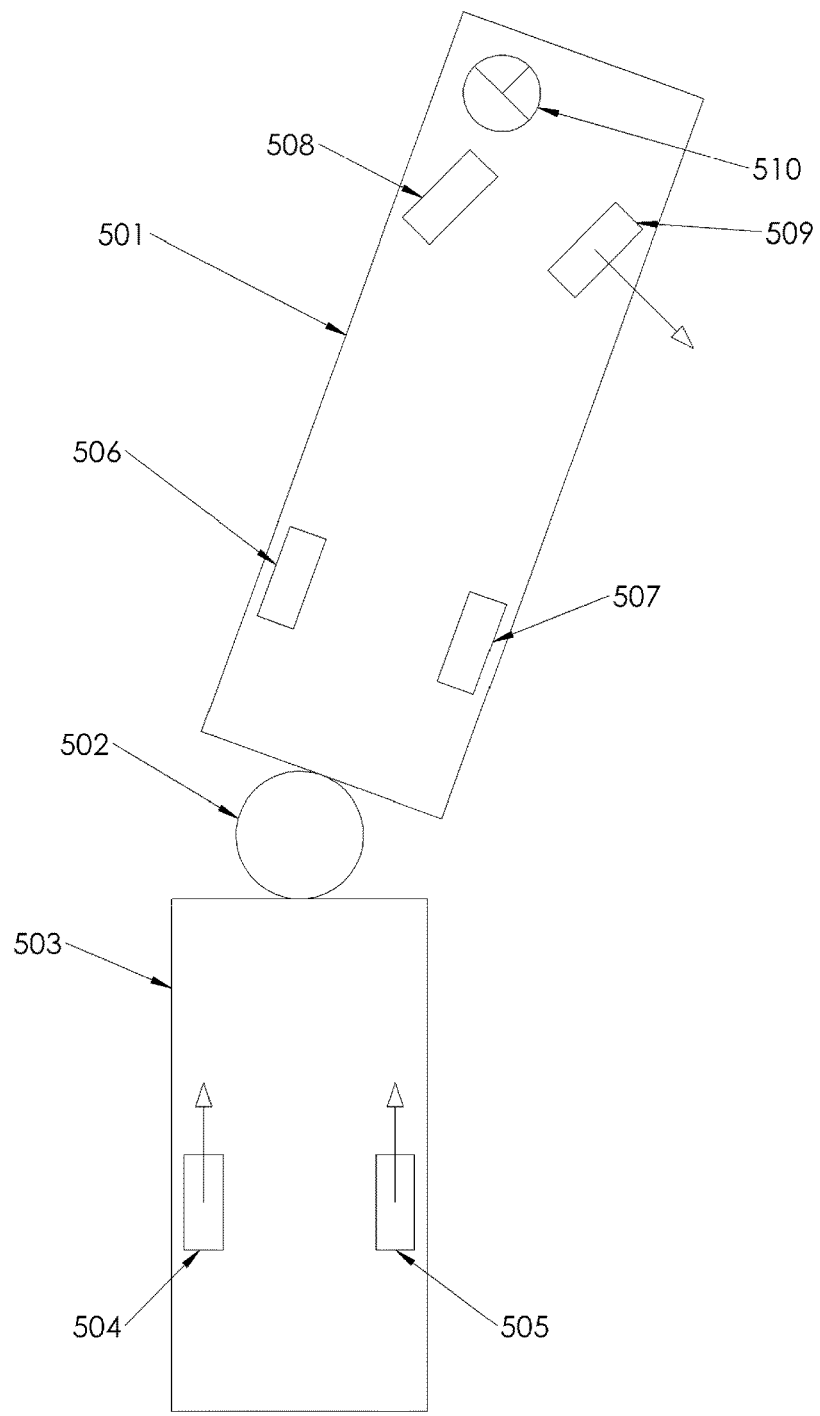
FIG. 3 schematically illustrates the architecture of the anti-jackknife steering system according to the embodiment of the present invention.

While the articulated bus is operated under an adverse weather condition, an additional friction is required to assist in the steering action. Please refer to FIG. 3. For increasing the friction, the control unit instructs a brake device to lock a steering wheel that is located inside the front wheel. In other words, the control unit may be integrated with an anti-lock brake system to brake the steering wheel that is located inside the front wheel.

For accurately forecasting a potential jackknife event or a potential oversteering event, the control unit further comprises accelerometers. One of the accelerometers is installed on the front frame and close to the front axle. Another accelerometer is installed on the trailer frame and close to the trailer axle. Consequently, the control unit can detect unexpected lateral acceleration and instruct the hydraulic turntable to increase the damping force to stabilize the trailer frame in advance.

More preferably, the control unit further comprises a wheel velocity sensor. The wheel velocity sensor is installed on a rear wheel of the front frame. The wheel velocity sensor is used for detecting the driving velocity of the articulated bus. Generally, the velocity of the rear wheel of the front frame is the closest to the real driving velocity. In contrast, the axel of the trailer frame is possibly slid on the road continuously or the velocity of the front axle is possibly unable to be read.

For avoiding possible damage, the following measures should be taken when an adverse weather condition is detected. For example, a velocity-limiting command is transmitted to the vehicular control unit to limit the driving velocity of the articulated bus. In addition, the velocity of the articulated bus is determined according to a velocity of a wheel on a non-steerable fixed axle.

What is claimed is:

1. An anti-jackknife steering system capable of use with an articulated bus, the anti-jackknife steering system comprising:
    a joint base installable on a front frame of the articulated bus;
    a hydraulic turntable installed on the joint base for adjusting a joint angle between the front frame and a trailer frame of the articulated bus in response to a control torsion force;
    a hydraulic pump for driving a small gear that is coupled with the hydraulic turntable;
    a wheel brake device capable of coupling with a set of front wheels of the articulated bus;
    two accelerometers separately installable on the trailer frame and the front frame of the—articulated bus for detecting an acceleration message of the trailer frame and an acceleration message of the front frame, respectively; and
    a control unit for judging whether a target joint angle of the hydraulic turntable matches a detected position of a steering wheel and comparing the detected acceleration message of the trailer frame with the detected acceleration message of the front frame, thereby judging whether a jackknife event occurs, wherein if the jackknife event occurs, the control unit increases a damping force of the hydraulic turntable and adjusts a joint angle of the hydraulic turntable to the target joint angle so as to stabilize the trailer frame.

2. The anti-jackknife steering system capable of use with the articulated bus according to claim 1, wherein a velocity of the articulated bus is judged according to a velocity of a wheel on a non-steerable fixed axle.

3. The anti-jackknife steering system capable of use with the articulated bus according to claim 1, wherein while the anti-jackknife steering system is enabled, the velocity of the articulated bus is limited according to a velocity-limiting means.

4. An anti-jackknife steering system capable of use with an articulated bus, the anti-jackknife steering system comprising:

a joint base installable on a front frame of the articulated bus;

a hydraulic turntable installed on the joint base for adjusting a joint angle between the front frame and a trailer frame of the articulated bus in response to a control torsion force;

a hydraulic pump for driving a small gear that is coupled with the hydraulic turntable;

two accelerometers separately installable on the trailer frame and the front frame of the—articulated bus for detecting an acceleration message of the trailer frame and an acceleration message of the front frame, respectively; and a control unit for judging whether a target joint angle of the hydraulic turntable matches a detected position of a steering wheel and comparing the detected acceleration message of the trailer frame with the detected acceleration message of the front frame, thereby judging whether a jackknife event occurs, wherein if the jackknife event occurs, the control unit increases a damping force of the hydraulic turntable and adjusts a joint angle of the hydraulic turntable to the target joint angle so as to stabilize the trailer frame.

5. The anti-jackknife steering system capable of use with the articulated bus according to claim 4, wherein a velocity of the articulated bus is judged according to a velocity of a wheel on a non-steerable fixed axle.

6. The anti-jackknife steering system capable of use with the articulated bus according to claim 4, wherein while the anti-jackknife steering system is enabled, the velocity of the articulated bus is limited according to a velocity-limiting means.

* * * * *